United States Patent

Holmes

[11] Patent Number: 6,099,782
[45] Date of Patent: *Aug. 8, 2000

[54] METHOD OF FORMING MOLDED AND LAMINATED CURVED SURFACE COMPOSITES

[75] Inventor: Stewart M. Holmes, Grantham, N.H.

[73] Assignee: CRX Limited, Grantham, N.H.

[*] Notice: This patent is subject to a terminal disclaimer.

[21] Appl. No.: 09/034,695

[22] Filed: Mar. 4, 1998

Related U.S. Application Data

[62] Division of application No. 08/597,164, Feb. 5, 1996, Pat. No. 5,783,228.

[51] Int. Cl.⁷ .................................................. B29C 43/20
[52] U.S. Cl. .......................... 264/266; 264/275; 264/319; 425/112
[58] Field of Search .................................. 264/259, 266, 264/275, 320; 425/112

[56] References Cited

U.S. PATENT DOCUMENTS

| | | | |
|---|---|---|---|
| 2,459,543 | 1/1949 | Schmerheim | 264/266 |
| 3,057,018 | 10/1962 | Lawrence et al. | 264/266 |
| 5,178,708 | 1/1993 | Hara et al. | 264/259 |
| 5,543,094 | 8/1996 | Hara et al. | 264/46.4 |

*Primary Examiner*—Jan H. Silbaugh
*Assistant Examiner*—Edmund H. Lee
*Attorney, Agent, or Firm*—Hayes, Soloway, Hennessey, Grossman and Hage

[57] ABSTRACT

A molded article with a pattern laminated thereon is formed in a single process step using a compression mold which has a mold ring element which is independently moveable of the top and bottom mold plate, but which can engage the periphery of the bottom surface of the top mold plate, and therein form a flat groove of appropriate depth to slidably retain the pattern layer which is to be molded to the finished article. When the mold plates close to form the molded article, the oversized groove in the mold ring allows the pattern layer to slide and conform to the surface of the molded part without ripping or wrinkling.

6 Claims, 2 Drawing Sheets

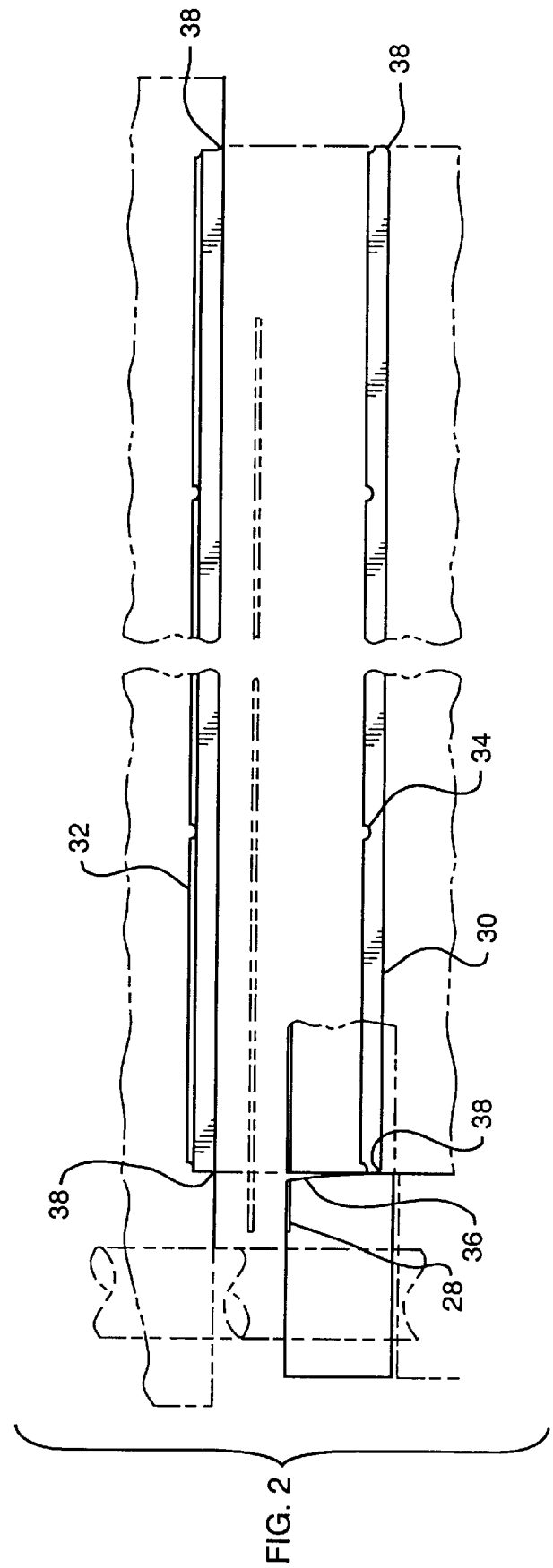

METHOD OF FORMING MOLDED AND LAMINATED CURVED SURFACE COMPOSITES

This is a divisional of application Ser. No. 08/597,164 filed on Feb. 5, 1996, now U.S. Pat. No. 5,783,228.

The present invention relates to a product and method for producing a curved surface composite material wherein a thermoset composite is manufactured containing a paper overlay characterized in that the paper is pressed into the composite material a desired amount, without rupturing or tearing of said overlay in the molding process. Accordingly, the present invention provides a composite material with a paper overlay characterized in that the paper is readily pressed into grooves in the composite, therein providing the ability to manufacture a composite material ideally suited for such applications as the preparation of a composite tile panel, with a decorative overlay design.

In the context of the present invention, it is noted that molded thermoset products are well known in the art, specifically, products manufactured from plastic materials generally known as amino resins, or phenolic resins and the like. Such thermoset materials ordinarily are molded by the techniques of compression molding, given the fact that such resins are in fact commercially available as molding powders and are known to cure in the presence of heat to provide a crosslinked material of relatively high strength and stiffness. In accordance with the manufacture of such resins by such procedures, it is common to incorporate various fillers and additives, to both improve the processing characteristics, and to improve or modify the properties of the resins after they are cured.

In addition, laminates of the above resins have been prepared, wherein a decorative laminate made or derived from paper, is bonded or adhered to the resin during cure and molding. Typically, the paper itself is porous, and may contain some of the resin so that it binds chemically to the molded product and provides a decorative aspect not available by the resin on its own.

However, numerous problems have been encountered in regards to preparing curved surfaces, as it can be appreciated that in the molding process, the laminate would necessarily have to remain protruding over the edge of the molding powder to be cured, in order to provide the necessary surface area to cover the final molded product on its edge side. Conventional compression molds do not accommodate such overlapping paper laminate, and if the paper is allowed to sit on top of the molding powder in a conventional compression mold design, the paper will be pinched by the mold cavity itself prior to being drawn into the mold and associated or bonded with the curved edge and incorporated into the molded product.

In addition, one long-standing problem with the production of a curved surface laminate, although such problem also exists in non-curved products, is the preparation of a laminate containing integral reinforcing type ribs which themselves contain an insert in the rib for receipt of a screw or other attachment means to connect the composite to a frame. That is, the prior art to date has not been able to successfully incorporate such inserts into composite materials during molding thereof.

Therefore, it is an object of the invention to overcome the disadvantages of the prior art and provide both a mold design which allows for a decorative laminate overlay to be drawn into the mold during the molding cycle without being stretched or torn in the overall molding process.

More specifically, it is an object of the invention to provide a mold for the compression molding of thermoset polymer resins, although other resins are contemplated, including thermoplastic resins, wherein the mold contains a region for the placement of an overlapping paper laminate, that can be drawn into the mold, and applied to a curved surface, in a manner that does not stretch or tear the laminate paper material.

Furthermore, it should be noted that it is an object of the present invention to prepare an integrally molded product having a curved surface, characterized in that the product is formed of a polymer or plastic material, and a laminating layer is affixed to the polymer or plastic material, in an integral manner.

Finally, it is also an object of this invention to prepare a composite material part containing a preformed insert which becomes part of the molded part and produces a site for attachment of said part to a frame or similar structure.

SUMMARY OF THE INVENTION

A molding press for simultaneously molding a product and laminating a pattern layer to the surface of the molded product comprising a bottom mold plate, a top mold plate, a mold ring element surrounding the mold plates and moveable independently of the top and bottom mold plates, an upper surface on said mold ring for engaging a peripheral edge of the top mold plate, and a flat groove in said mold ring upper surface which is slightly deeper than the thickness of a pattern layer to be laminated to the top surface of the final molded product.

In process form, the present invention provides a process for simultaneously molding a product and laminating a pattern to the surface of the molded product comprising the use of a mold having a bottom mold plate, a top mold plate, a mold ring element surrounding the mold plate and moveable independently of the upper and lower mold plates, wherein the edges of said top mold plate overlap an inner portion of the mold ring element providing a flat space between adjacent surfaces of the said mold plate and said mold ring element, followed by supporting said pattern layer at its edges in said flat space while maintaining the space slightly thicker than the thickness of the pattern layer so that said layer is free to slide laterally across the upper surface of said mold ring towards the mold interior during the molding process, followed by filling the volume provided by the lowered bottom mold plate and the mold ring to the level of the inner edge of the mold ring with a heat setting molding powder, raising said lower mold plate to compress and cure the molding powder and laminating said pattern to the upper surface of said cured molded product.

In product form, the present invention comprises and integral molded product having a curved surface to which is bonded a pattern layer, said molded product being formed of a heat curable reactive polymer resin and said pattern layer including a porous structure into which said reactive polymer resin penetrates and cures to unify or bond the pattern layer and the curved molded product surface.

In addition, the present invention discloses an integral formed molded product said molded product being formed of a heat curable reactive polymer resin containing an integrally formed reinforcing rib including an insert in said rib which bonds to said heat curable reactive polymer resin during molding thereof, and which insert provides means for attaching said integrally formed product to a frame or support structure.

BRIEF DESCRIPTION OF THE DRAWINGS

A preferred construction for a molding press in accordance with the present invention is illustrated in the accompanying drawings wherein:

FIG. 2 is an exploded view of a molding press, illustrating the use of the present invention for the manufacture of a tile slab wherein a decorative laminate overlay is pressed into the grooves of the tile, without stretching or tearing.

DETAILED DESCRIPTION OF THE PREFERRED EMBODIMENTS

Figure 1:
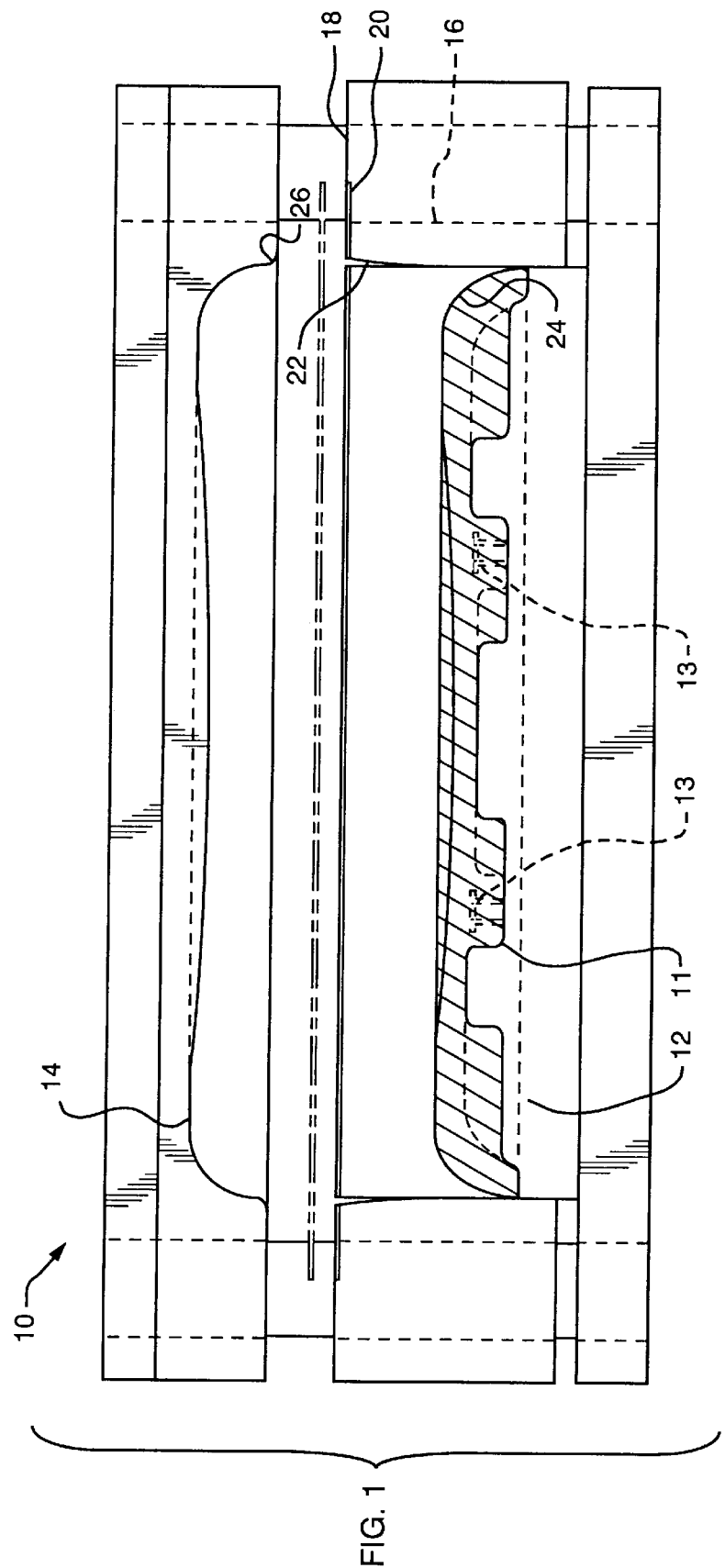
FIG. 1 is an exploded view of the molding press, illustrating the mold ring element and its location for supporting the laminate to be affixed to the curved surface of a molded product.

With reference to the drawings, FIG. 1 provides a view of the preferred molding for preparing the integrally shaped or molded product of the present invention. More specifically, as shown in FIG. 1, the mold (10) comprises a bottom mold plate (12), a top mold plate (14), a mold ring element (16) surrounding the mold plates and moveable independently of the top and bottom mold plates, an upper surface (18) on said mold ring for engaging a peripheral edge of the top mold plate, and a flat groove (20) in said mold ring upper surface which is slightly deeper than the thickness of a pattern layer to be laminated to the top surface of the final molded product.

With reference to FIG. 1, it should be noted that in a preferred embodiment, the flat groove (20) is about 0.025 inches deep in opening (i.e., the opening created and available for the laminate overlay when the mold is closed) and runs 0.50 inches–1.5 inches horizontally into the ring. In addition, it should be noted that there is a taper along the length of the mold shown generally at (22), preferably about a 2–5° taper, which taper runs 0.5–2.0 inches vertically, and which makes it easier for the paper to effectively be drawn into the mold and assume the rounded edge configuration of the molded part shown generally at (24). In addition, it is preferably to incorporate a rounded edge (26) on the top mold plate, which preferably has a radius of not less than 0.150 inches, and which serves to draw the laminate into the mold and onto the rounded edge of the molding resin, in the molding cycle, without stretching and/or tearing.

In the operation of the mold described in FIG. 1, it can be appreciated that a preferred laminate paper material is any patterned paper from 26# to 67# paper which refers to the saturation level of liquid melamine by weight, and a preferred molding powder comprises a mixture of "Cymel 405LD" (a powdered melamine available from Cytec, Inc., and 40–70 mesh woodflour composed of birch, maple and ash. In conjunction with the use of such components, a preferred molding cycle contemplates preheating at 290–305° F., followed, followed by compression molding under a pressure of 700–1400 psi for 8–15 minutes, and recovery and removal of the integral formed molded product.

In addition, FIG. 1 shows at 11 an integral rib which reinforces the molded seat product illustrated. Also shown is insert 13 placed into the rib which becomes part of the molded rib or surface and provides a site for attachment to a frame or similar structural support. Preferably insert 13 is a metal insert with internal threads to accommodate screw-type mounting and attachment.

As noted above, FIG. 2 shows yet another preferred embodiment of the present invention illustrating the use of a mold suitable for the preparation of a tile slab wherein a decorative laminate overlay is pressed into the grooves of the tile, without stretching or tearing. Specifically, a flat groove is shown at (28), along with the bottom mold plate (30), top mold plate (32), with the groove location on the bottom plate shown generally at (34). It can be appreciated that when the bottom and top mold plates are brought together, the laminate paper can be pressed into the mold, into the grooves (34), without rupture, inasmuch as the paper laminate rests, prior to molding in groove (28). In such manner, a decorative design of any desired type can be configured and located on the tile face, and the corresponding grout line drawn on the decorative laminate which contains no decorative design itself is pressed into the groove (34) thereby producing a tile slab that in many respects simulates the effect one achieves by putting together tile sections, by a grouting operation. Accordingly, the present invention provides a panel, or as described earlier, a slab of compression molded material that simulates tile appearance, but avoids the disadvantages of tile installation.

In connection with FIG. 2, the flat groove is preferably 0.025 inches deep in opening and runs 0.5–1.5 inches horizontally into the ring. In addition, a taper is present at 36, preferably about 2–5°, which as previously noted in the earlier mentioned embodiment, assists and makes it easier to draw the paper inwardly. The taper runs preferably 0.50–1.0 inches from the top of the ring when molding decorative overlay tile. Also shown at 38 is a rounded edge on the top cavity which preferably includes a radius of not less than 0.060 inches, which assists in drawing paper around the tile being molded.

Finally, the present invention provides an integral formed molded product comprising a curves surface which is bonded to a pattern or decorative laminate layer wherein the molded product is formed from a heat curable reactive polymer resin. Suitable heat curable reactive polymer resins are those resins generally known as amino resins, which include urea/formaldehyde or melamine/formaldehyde molding resins, or mixtures thereof. Particularly preferred resins in this regard include "Cymel 405LD" or equivalent resin, which is available from Cytec Industries, Inc. However, it should be noted that the present invention is not limited to such amino resins, as practically any thermoset resin that is available as a molding powder would be suitable for preparing the integrally shaped molded product, by the process described herein. In addition, although the resin is preferably heat curable, it can be appreciated that catalytic curing of the resin is an option, wherein the catalyst serves to provide the necessary growth in molecular weight so that the molding resin is advanced into a final cured state. In addition, other components and additives can be additive to the resins, either to control the degree of cure, or to modify properties of the resin after curing.

Those skilled in the art will recognize, or be able to ascertain, using no more than routine experimentation, many equivalents to the specific embodiments of the invention described herein. Such equivalents are intended to be encompassed by the following claims.

I claim:

1. A process for simultaneously molding a product and laminating a pattern layer having a selected thickness to a top surface of the molded product comprising the steps in sequence of:

supplying a molding press comprising a bottom mold plate, a top mold plate, a mold ring element containing an inner edge surrounding the mold plates and moveable independently of the top and bottom mold plates, an upper surface on said mold ring for engaging a peripheral edge of the top mold plate, and a flat groove in said mold ring upper surface adjacent said inner edge of said mold ring and surrounding the interior periphery of said mold ring which is slightly deeper than the thickness of said pattern layer to be laminated to the top surface of the molded product;

supporting said pattern layer at the edges of said pattern layer in said flat groove while maintaining a space slightly thicker than the thickness of the pattern layer so that said pattern layer is free to slide laterally across the upper surface of said mold ring towards an interior of the mold during the molding process;

lowering said bottom mold plate relative to said top mold plate and said mold ring and filling the volume provided by the lowered bottom mold plate and interior walls of the mold ring to a level of said inner edge of said mold ring with a heat curing molding powder; and raising the lowered bottom plate to simultaneously compression mold the molding powder within the molding press to form the molded product and laminate the pattern layer to the top surface of the molded product.

2. The process of claim 1, wherein said flat groove located in said upper surface of said mold ring element is about 0.025 inches deeper than the thickness of said pattern layer.

3. The process of claim 1, wherein said flat groove in said mold ring element runs 0.50 to 1.5 inches horizontally into said mold ring element.

4. The process of claim 1, wherein the bottom mold plate has a vertical edge which is tapered about 2–5 degrees inwardly from vertical.

5. The process of claim 4, wherein said taper extends 0.50–2.0 inches vertically.

6. The process of claim 4, wherein said taper extends 0.50 to 1.0 inches vertically.

* * * * *